US011112999B2

(12) United States Patent
Shveidel et al.

(10) Patent No.: US 11,112,999 B2
(45) Date of Patent: Sep. 7, 2021

(54) OPTIMIZING I/O LATENCY BY SOFTWARE STACK LATENCY REDUCTION IN A COOPERATIVE THREAD PROCESSING MODEL

(71) Applicant: EMC IP HOLDING COMPANY LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 120 days.

(21) Appl. No.: 16/524,954

(22) Filed: Jul. 29, 2019

(65) Prior Publication Data
US 2021/0034287 A1 Feb. 4, 2021

(51) Int. Cl.
*G06F 3/06* (2006.01)
*G06F 9/445* (2018.01)
*G06F 9/48* (2006.01)

(52) U.S. Cl.
CPC .......... *G06F 3/0659* (2013.01); *G06F 3/0604* (2013.01); *G06F 3/0673* (2013.01); *G06F 9/44521* (2013.01)

(58) Field of Classification Search
None
See application file for complete search history.

(56) References Cited

U.S. PATENT DOCUMENTS

| | | | | |
|---|---|---|---|---|
| 6,718,370 B1 * | 4/2004 | Coffman | ................. | H04L 47/50 709/212 |
| 10,657,084 B1 * | 5/2020 | Thyamagondlu | ....... | G06F 13/28 |
| 2003/0204552 A1 * | 10/2003 | Zuberi | .................... | H04L 69/12 718/103 |
| 2008/0065869 A1 * | 3/2008 | Kim | ...................... | G06F 3/0482 712/229 |
| 2008/0256280 A1 * | 10/2008 | Ma | ......................... | G06F 9/4812 710/263 |
| 2011/0185209 A1 * | 7/2011 | Shimotono | .......... | G06F 1/3268 713/323 |
| 2017/0242594 A1 * | 8/2017 | Liu | ....................... | G06F 3/0611 |
| 2018/0335957 A1 * | 11/2018 | Enz | ....................... | G06F 3/0613 |
| 2019/0129619 A1 * | 5/2019 | Boddukuri | ............ | G06F 3/0619 |

\* cited by examiner

*Primary Examiner* — Michael Alsip
(74) *Attorney, Agent, or Firm* — Daly, Crowley, Mofford & Durkee, LLP (57) ABSTRACT

A method for use in a storage node, the method comprising: instantiating a first poller for detecting whether pending storage device operations have been completed; executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, (b) terminating the execution of the first poller when the completion queue is empty, and (c) executing a system call function to the storage device driver when the completion queue is non-empty; identifying a first thread that is waiting for the first storage device operation to be completed; and transitioning the first thread from a waiting state to a ready state.

15 Claims, 6 Drawing Sheets

OPTIMIZING I/O LATENCY BY SOFTWARE STACK LATENCY REDUCTION IN A COOPERATIVE THREAD PROCESSING MODEL

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage node is provided, the method comprising: instantiating a first poller for detecting whether pending storage device operations have been completed; executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, (b) terminating the execution of the first poller when the completion queue is empty, and (c) executing a system call function to the storage device driver when the completion queue is non-empty; identifying a first thread that is waiting for the first storage device operation to be completed; and transitioning the first thread from a waiting state to a ready state.

According to aspects of the disclosure, an apparatus is provided, comprising: a memory; and a processing circuitry operatively coupled to the memory, the processing circuitry being configured to perform the operations of: instantiating a first poller for detecting whether pending storage device operations have been completed; executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, (b) terminating the execution of the first poller when the completion queue is empty, and (c) executing a system call function to the storage device driver when the completion queue is non-empty; identifying a first thread that is waiting for the first storage device operation to be completed; and transitioning the first thread from a waiting state to a ready state.

According to aspects of the disclosure, a non-transitory computer-readable medium is provided that stores one or more processor-executable instructions, which when executed by a processing circuitry of a storage node cause the processing circuitry to perform the operations of: instantiating a first poller for detecting whether pending storage device operations have been completed; executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, (b) terminating the execution of the first poller when the completion queue is empty, and (c) executing a system call function to the storage device driver when the completion queue is non-empty; identifying a first thread that is waiting for the first storage device operation to be completed; and transitioning the first thread from a waiting state to a ready state.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

A poller may include a thread or a process that is configured to interact with a storage device driver to detect storage device operations that have been completed. Upon detecting a completed storage device operation, the poller may generate an event and/or wake up a thread that is waiting for the storage device operation to complete. Traditional pollers may be executed at predetermined intervals (e.g., every 100 ms). However, when low-latency storage devices are used (e.g., devices that have latency under 20 microseconds), the rate at which traditional pollers can detect completed storage device operations may lag too far behind the rate at which the storage device operations are completed. In other words, the event-reaction delay of traditional pollers may be insufficient to operate the low-latency storage devices at their full potential and realize system performance improvements that are commensurate with their low latency.

According to one aspect of the disclosure, a low-latency poller is disclosed that is suitable for use with low-latency storage devices. The low-latency poller issues system calls to a storage device driver only when the completion queue of the storage device driver is not empty. Specifically, the low-latency poller may detect whether the completion queue is empty by reading the value of a variable (in the memory space of the storage device driver) that indicates the size of the completion queue. If the completion queue is not empty, the low-latency poller may issue one or more system calls to identify the storage device operations that have completed. On the other hand, if the completion queue is empty, the low-latency poller may terminate without executing any system calls to the device driver.

Making the execution of system calls conditional on the completion queue not being empty may help increase the efficiency of the low-latency poller. Because the read operation, which is needed to determine whether the completion queue is empty, does not require the use of synchronization objects or context switching from userspace to kernel space, the read operation consumes much less processor time than executing a system call to the storage device driver. In this regard, reading the size of the queue first, and executing system calls on condition that the completion queue is non-empty, could save processor time that would go to waste if the system calls were to be executed while the completion queue is empty. In other words, the limited (or conditional) execution of system call functions renders the low-latency poller more efficient than traditional pullers because it enables the low-latency poller to handle empty cycles more efficiently than the traditional pollers.

In some circumstances, traditional pollers may rely on indiscriminate system calls irrespective of whether the driver's completion queue is empty. Such function calls require context switching from userspace to kernel space, and as such they may be resource-intensive. In this regard, simply increasing the rate at which traditional pollers are executed may not work because it would result in excessive resource consumption. However, because the low-latency poller processes empty cycles more efficiently, the low latency poller may be executed at higher rates than traditional pollers without causing excessive resource consumption under the same circumstances.

Figure 1:
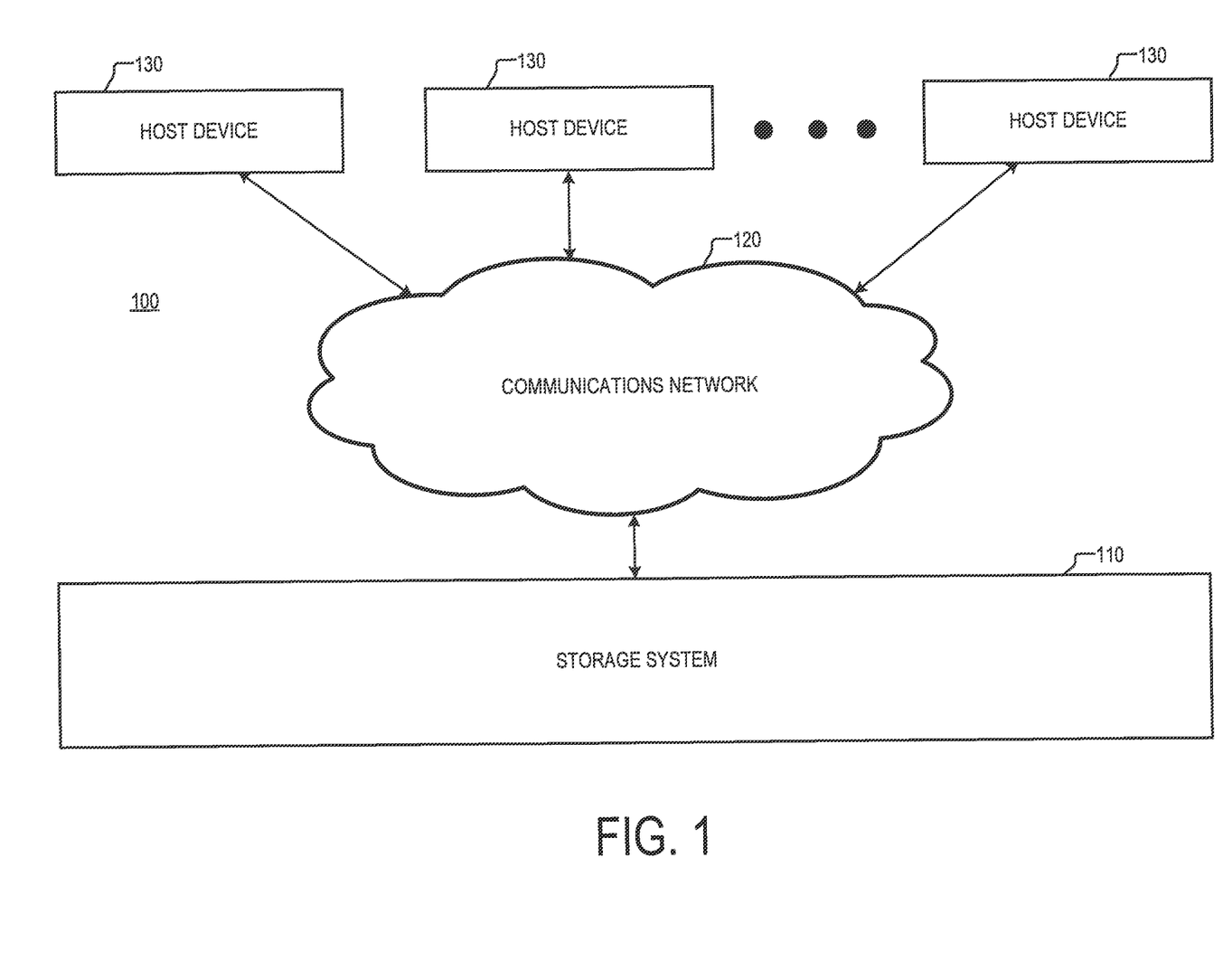
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device. The storage system 110 may include a midrange storage system, an enterprise storage system, and/or any other suitable type of storage system.

Figure 2:
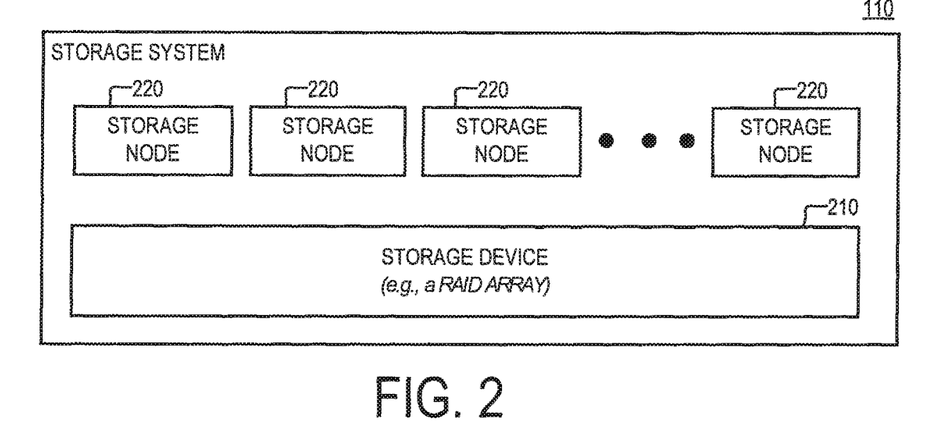
FIG. 2 is a diagram of an example of a storage system, according to aspects of the disclosure.

FIG. 2 is a diagram of the storage system 110, according to aspects of the disclosure. As illustrated, the storage system 110 may include a storage device 210 and a plurality of storage nodes 220. The storage device 210 may include one or more of a non-volatile Random-Access Memory (nvRAM), a Solid State Drive (SSD), a Hard Drive, a flash memory, and/or any other suitable type of storage device. According to the present example, the storage device 210 includes a RAID array having a plurality of SSDs. However, it will be understood that the present disclosure is not limited to any specific implementation of the storage device 210. Each of the storage nodes 220 may include any suitable type of computing device, such as a storage server, a desktop computer, a laptop, etc. In some implementations, any of the storage nodes 220 may be configured as discussed with respect to FIG. 3.

Figure 3:
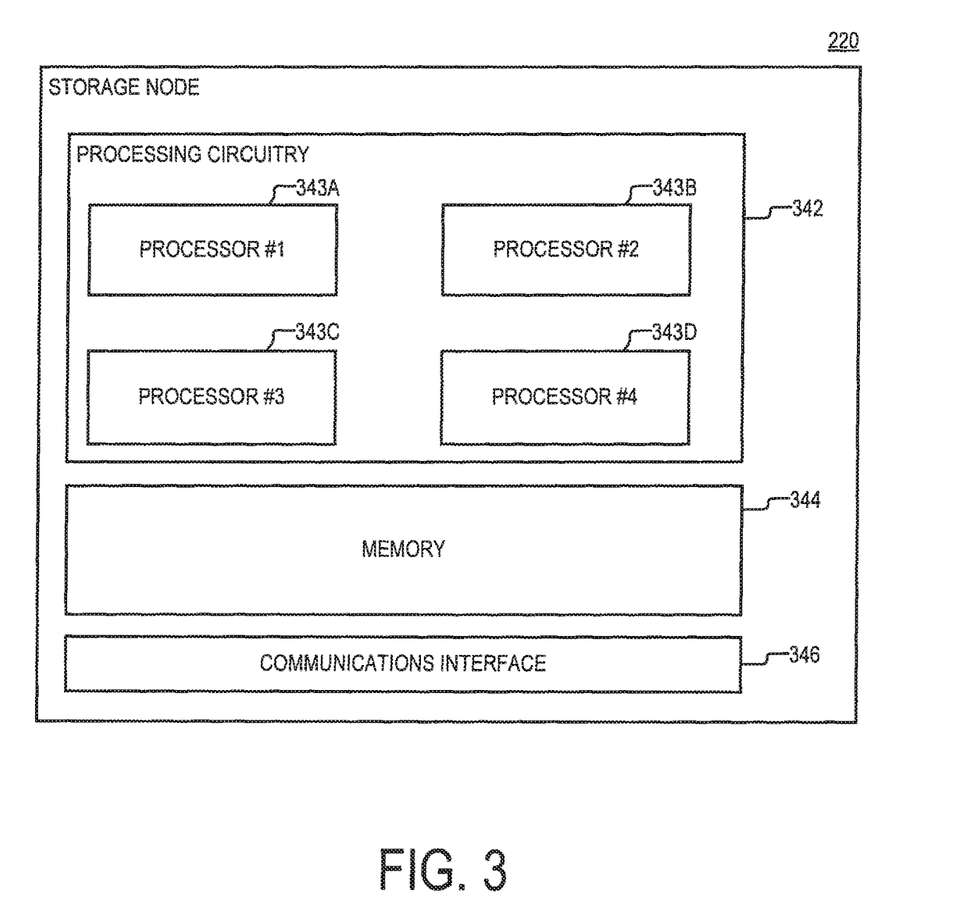
FIG. 3 is a diagram of a storage node, according to aspects of the disclosure.

FIG. 3 is a diagram of an example of a storage node 220, according to aspects of the disclosure. As illustrated, the storage node 330 may include a processing circuitry 342, a memory 344, and a communications interface 346. The processing circuitry 342 may include at least one of a general-purpose processor (e.g., a RISC processor or an x86 processor), a Field Programmable Gate Array (FPGA), an Application Specific integrated Circuit (ASIC), and/or any other suitable type of processing circuitry. The memory 344 may include any suitable type of volatile and/or non-volatile memory such as a Solid-State Drive (SSD), random-access memory (RAM), read-only memory (ROM), flash memory, EEPROM memory, Dynamic Random-Access Memory (DRAM) and/or any other suitable type of memory. The communications interface 346 may include one or more of an InfiniBand interface, an Ethernet interface, an 802.11 (WiFi) interface, a Bluetooth interface, and/or any other suitable type of interface. Although not shown, the storage node 330 may include any suitable type of I/O device (e.g., a keyboard, a displace, a mouse, etc.), as uninterruptible power supply (UPS), and/or any other component that is normally found in storage nodes. In some implementations, the processing circuitry 342 may include a plurality of processors 343. As is further discussed below with respect to FIGS. 4 and 6, each of the processors 343 may be configured to execute a different poller 410/620. In some implementations, any two of the processors 343 may be separate processing units. Additionally or alternatively, in some implementations, any two of the processors may be different cores that are part of the same processing unit. Stated succinctly, the present disclosure is not limited to any specific implementation of the processors 343.

Figure 4:
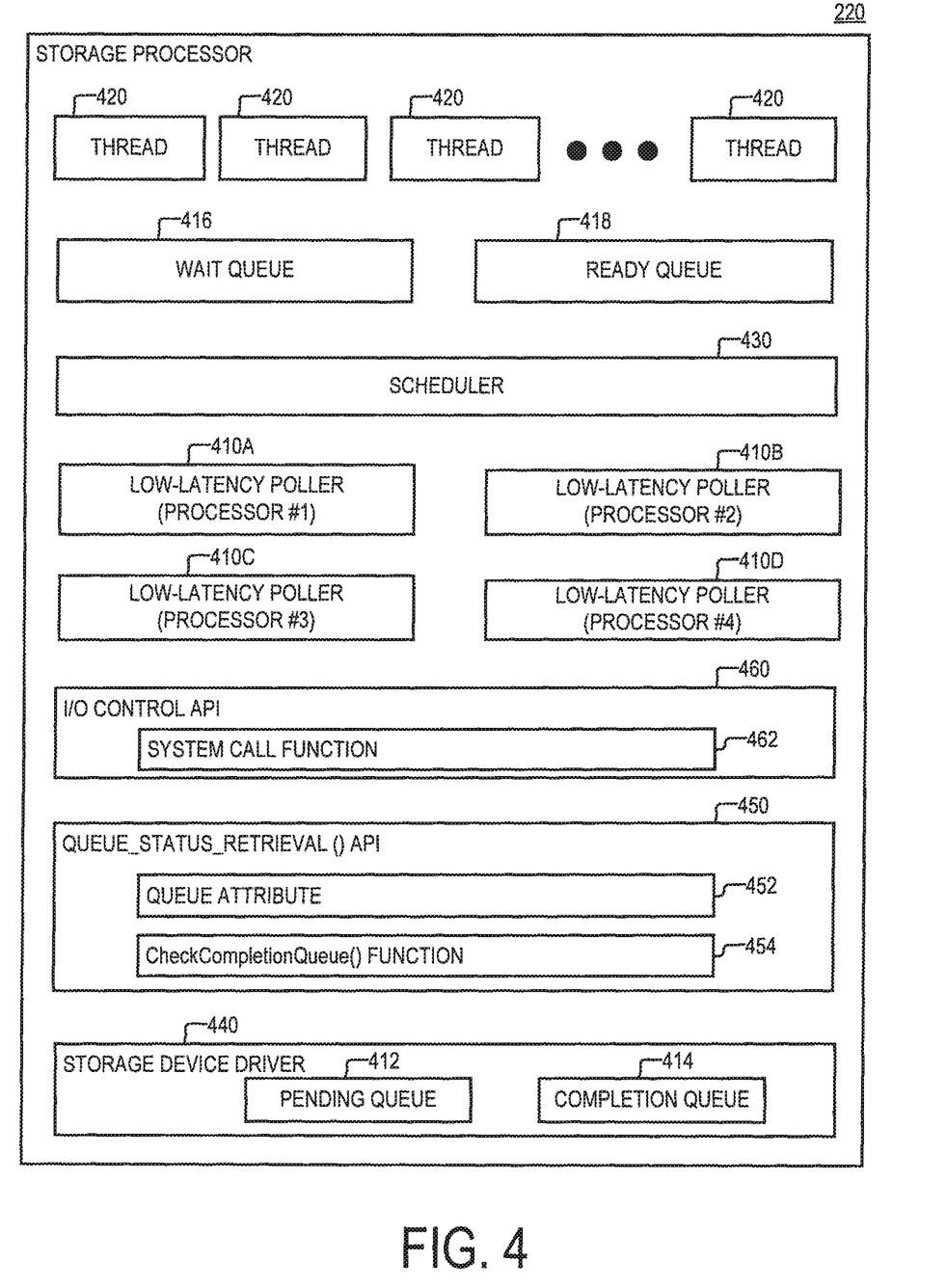
FIG. 4 is a diagram of an example of a storage node, according to aspects of the disclosure.

FIG. 4 shows an example of one possible configuration of the storage node 220, according to aspects of the disclosure. As illustrated, the storage node 320 may be configured to store in memory a pending queue 412, a completion queue 414, a wait queue 416, and a ready queue 418. Furthermore, the storage node 220 may be configured to execute a plurality of pollers 410, a plurality of threads 420, a scheduler 430, a storage device driver 440, an API 450, and an API 450.

The pollers 410 may be arranged to detect the completion of storage device operations by the storage device 210. Additionally or alternatively, in some implementations the pollers 410 may be configured to wake up threads that are waiting for the storage device operations to complete and/or generate events indicating that the storage device operations have been completed. In some implementations, each of the pollers 410 may be executed by a different one of the processors 343. According to the present example, poller 410a is executed on processor 343a, poller 410b is executed on processor 343b, poller 410c is executed on processor 343c, and poller 410d is executed on processor 343d. Furthermore, in some implementations, each of the pollers 410 may be executed periodically or repeatedly (e.g., every 60 ms). According to aspects of the disclosure, the approximate (and/or average) time period between subsequent execution of a poller is herein referred to as an "execution period" of that poller.

The pending queue 412 may identify one or more storage device operations that have been requested by any of the threads 420, and which have not been completed yet. The completion queue 414 may identify one or more storage device operation that have been requested by any of the threads 420, and which are already completed. The wait queue 416 may identify one or more of the threads 420 that have been paused until storage device operations (requested by them) are completed. The ready queue 418 may identify one or more threads that are ready to be executed by the scheduler 430.

Each of the threads 420 may be configured to interact with the storage device 210 in a well-known fashion. For example, any given thread 420 may be configured to write data to the storage device 210, read data from the storage device 210, delete data from the storage device 210, and/or perform any other suitable type of storage device operation. In operation, any given thread 420 may transmit a request for a storage device operation to the storage device driver 440. Next, after the submission of the request, the thread 420 may enter a waiting state (e.g., a suspended state), until the storage device operation is completed by the storage device 210. After the storage device operation is completed, the thread 420 can be returned to a ready state, after which the thread 420 can be executed by the scheduler 430 when its turn comes. As noted above, when the given thread 420 is in the waiting state, the given thread 420 may be placed in the wait queue 416, and when the given thread 420 is ready, the given thread 420 can be placed in the ready queue 418. According to aspects of the disclosure, the term "thread" may refer to any sequence of processor-executable instructions that is independently controlled by a scheduler, without regard whether the scheduler is an operating system scheduler or a scheduler that is executed on top of the operating system.

The scheduler 430 may include a cooperative scheduler, and the storage node 220 may implement a cooperative thread processing model. However, alternative implementations are possible in which the scheduler 430 is a preemptive scheduler and/or any other suitable type of scheduler. Stated succinctly, the present disclosure is not limited to any specific implementation of the scheduler 430.

The storage device driver 440 may provide the threads 420 with an interface for accessing the storage device 210. In operation, the storage device driver 440 may receive a request to perform a storage device operation. The request may be received from any given one of the threads 420. Next, the storage device driver 440 may add the storage device operation to the pending queue 412. Next, the storage device operation may be retrieved from the pending queue 412 and executed by the storage device 210. Next, after the storage device operation is completed, the storage device operation may be removed from the pending queue 412 and added to the completion queue 414.

The API 450 may implement a CheckCompletionQueue( ) function 454 which returns TRUE when the completion queue is not empty and FALSE if the completion queue is empty. The CheckCompletionQueue( ) function 454 may be configured to read the value of a variable stored in the memory space of the storage device driver 440, which indicates the size of the queue and return TRUE if the value of the variable indicates that the completion queue 414 is not empty or FALSE if the value of the variable indicates that the completion queue 414 is empty. In some implementations, the value of the variable may be read by using a pointer 452 that maps the variable from the memory space of the storage device driver 440 to the memory space of the API 450. Additionally or alternatively, in some implementations, the CheckCompletionQueue( ) function 454 may be configured as a read-only function and executed in the userspace of the storage node 220, while the pointer 414 maps a variable that is stored in the kernel space of the storage node 220 to the userspace of the storage node 220. In such implementations, executing the CheckCompletionQueue( ) function 454 to read the value of the variable (and determine whether the completion queue 414 is empty) may be more efficient than using system calls to detect that the completion queue 414 is empty because the latter might require the use of kernel locks and the performance of a context switch from userspace to kernel space by the storage node 220.

The API 460 may implement a function 462 that interacts with the storage device driver 440. In some implementations, the function 462 may be the ioctl( ) function (in Linux) or the DeviceIoControl( ) function (in Microsoft Windows™), and or any other suitable type of operation that involves switching to kernel mode. According to the present example, executing the system call function results in the use of synchronization objects and/or a context switch from the userspace of the storage node 220 to the kernel space of the storage node 220. According to the present disclosure, the execution of the system call function is more processor-intensive (and/or time-consuming) than executing the CheckCompletionQueue( ) function 454 because it requires a switch to kernel mode (e g., a context switch from userspace to kernel space, etc.).

Each of the pollers 410 may poll the storage device driver 440 to identify storage device operations that have completed. As is further discussed below, when the completion call is non-empty, the poller 410 may execute one or more ioctl system call functions (with the appropriate parameters) that cause the storage device driver to: (i) return the identifiers of storage device operations that are listed in the completion queue, (ii) and remove those storage device operations from the queue. Afterward, the poller 410 may either generate an event, for each of the storage device operations, indicating that the storage device is completed or wake up any threads 420 that are waiting for the storage device operations to be completed. Waking up any of the threads 420 may include removing the thread from the waiting queue 416 and adding the thread to the ready queue 418.

According to the present example, each of the pollers 410 is configured to identify only storage device operations that are requested by threads 420 that are executed on the same processor 343 as the poller 410. For example, poller 410*a* may identify completed storage device operations that have been requested by threads executed on the processor 343*a*; poller 410*b* may identify completed device operations that have been requested by threads executed on the processor 343*b*; poller 410*c* may identify completed device operations that have been requested by threads executed on the processor 343*c*; and poller 410*d* may identify completed device operations that have been requested by threads executed on the processor 343*d*.

Additionally or alternatively, according to the present example, each poller 410 may be configured to wake up threads 420 that are executed on the same processor as the poller. For example, the poller 410*a* may wake up only threads that are executed on the processor 343*a*; the poller 410*b* may wake up only threads 420 that are executed on processor 343*b*; the poller 410*c* may wake up only threads 420 that are executed on processor 343*c*; and poller 410*d* may be configured to wake up only threads 420 that are executed on the processor 343*d*.

Although in the present example, each of the pollers 410 is implemented in software, alternative implementations are possible in which any of the pollers 410 and 420 is implemented in hardware or as a combination of software and hardware. In some implementations, the phrase "adding a thread to a queue" may refer to adding identifier corresponding to the thread to the queue. In some implementations, the phrase "removing a thread from a queue" may refer to removing an identifier corresponding to the thread from the queue. In some implementations, the phrase "adding a storage device operation to a queue" may refer to adding identifier corresponding to the storage device operation to the queue. In some implementations, the phrase "removing a storage device operation from a queue" may refer to removing an identifier corresponding to the storage device operation from the queue. As used throughout the disclosure, the term "queue" may refer to any suitable type of data structure that is used by the scheduler 430 and/or storage device driver 440 to manage the threads 420 or storage device request. In this regard, it will be understood that the meaning of the term "queue" is not limited to first-in-first-out (FIFO) data structures. As used throughout the disclosure, the term "waiting state" may refer to any state in which a thread is not being actively scheduled by the scheduler 430, such as a suspended state, etc.

Figure 5:
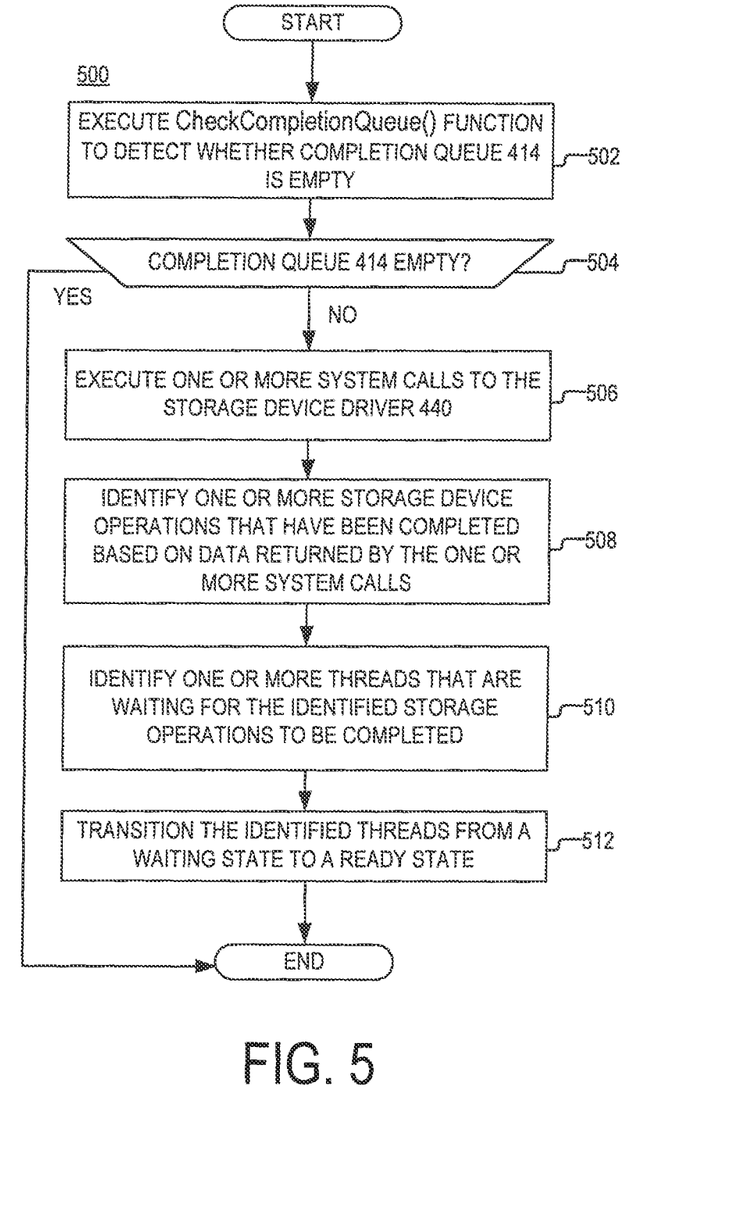
FIG. 5 is a flowchart of an example of a process, according to aspects of the disclosure.

FIG. 5 is a flowchart of an example of a process 500 that is performed by any of the pollers 410, according to aspects of the disclosure. At step 502, the CheckCompletionQueue ( ) function 454 is called. At step 504, the value returned by the CheckCompletionQueue( ) function 454 is examined to determine if the completion queue 414 is empty. If the completion queue 414 is empty, the process 500 is terminated. Otherwise, if the completion queue 414 is not empty, the process 500 proceeds to step 506. At step 506, one or more system calls are made to the storage device driver 440. In some implementations, the one or more system calls may be made by using function 462. At step 508, the data returned by the calls is examined to identify one or more storage device operations that have been completed by the storage device 210. At step 510, for each of the completed storage device operations, a thread 420 is identified that is: (i) associated with the storage device operation, (ii) which has been placed in a waiting state until the operation is completed and is not waiting on other operations to complete, and (iii) which is currently in the wait queue 416. At step 512, each of the identified threads 420 is transitioned from the waiting state to a ready state. In some implementations, transitioning the thread 420 from the waiting state may include removing the thread 420 from the wait queue 416 and adding the thread 420 to the ready queue 418.

As noted above, executing the CheckCompletionQueue function 454 is less processor-intensive than placing system calls to the storage device driver 440. In this regard, executing the CheckCompletionQueue( ) function 454, at step 502, may decrease the latency of completion of the poller (executing process 500), because it would allow the poller to discover that the completion queue 414 is empty and terminate the process 500 immediately, without the placement of time-consuming system calls to the storage device driver 440 only to discover the same. As can be readily appreciated, in some implementations, decreasing the pollen's latency of completion may help increase the rate at which the poller is executed.

Furthermore, although in the example of FIG. 5, threads are transitioned from the suspended state to the ready state by the poller executing the process 500, alternative implementations are possible in which the executing poller generates a respective event for each of the completed storage operations. In such implementations, the scheduler 430 may detect each event, identify a respective thread that is associated with the event, and transition the identified thread from the waiting state to the ready state. Stated succinctly, the present disclosure is not limited to any specific allocation of the steps in process 500 to different (software and/or hardware) components of the storage node 220.

Figure 6:
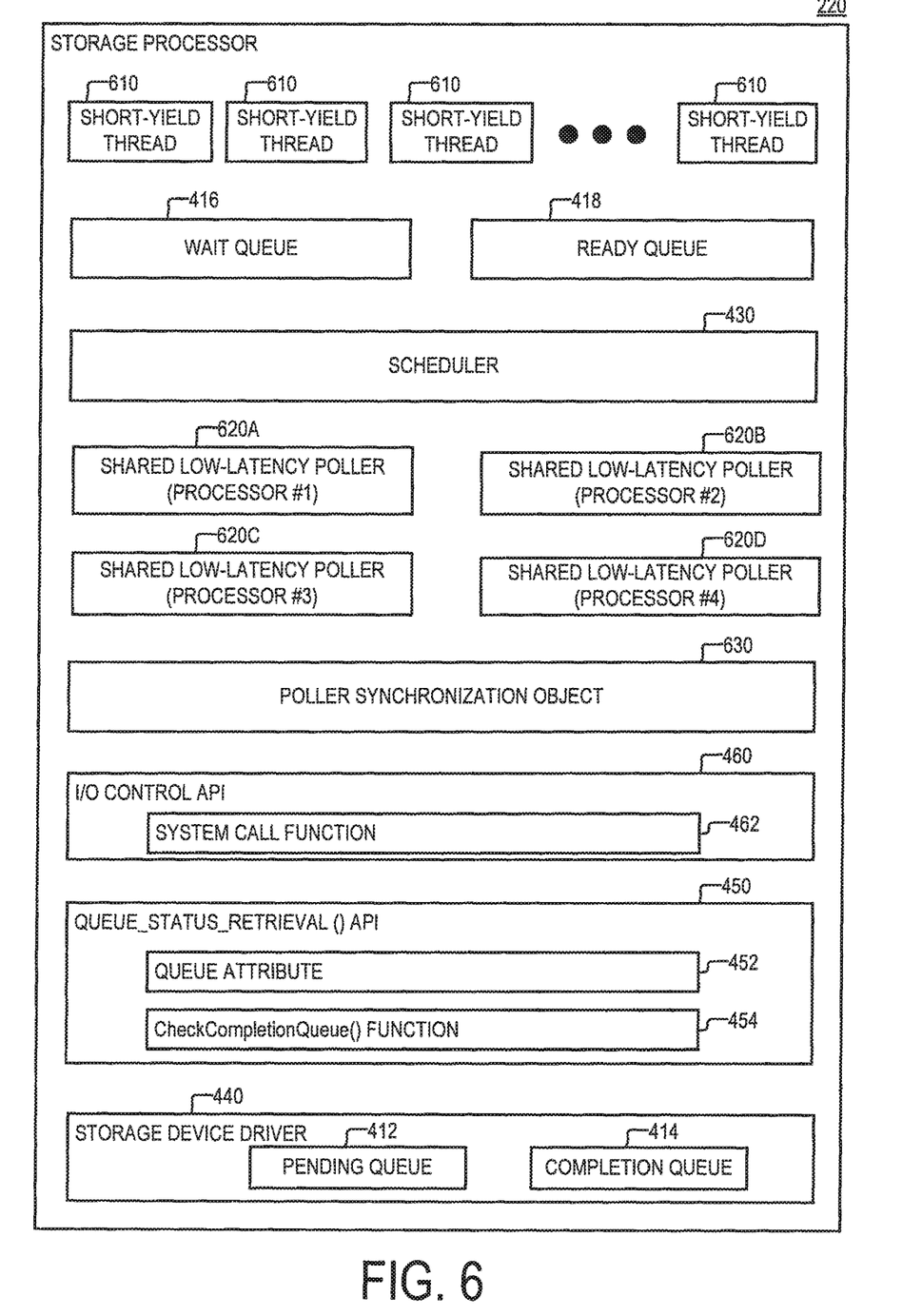
FIG. 6 is a diagram of a storage node, according to aspects of the disclosure.

FIG. 6 shows an example of another possible configuration of the storage node 220, according to aspects of the disclosure. In the example of FIG. 6, the storage node 220 is configured to execute short-yield threads 610 instead of the threads 420. Furthermore, in the example of FIG. 6, the storage node 220 is configured to execute shared pollers 620 instead of the pollers 410. And still furthermore, in the example of FIG. 6, the execution of the shared pollers 620 is synchronized by using a poller synchronization object 630, whereas in the example of FIG. 4, the execution of the pollers 410 is not synchronized.

Each of the threads 610 may be configured to write data to the storage device 210, read data from the storage device 210, delete data from the storage device 210, and/or perform any other suitable type of storage device operation. Furthermore, each of the threads 610 may be configured to have a yield period that is selected based on the execution period of the pollers 620. For example, if a poller 620 is desired to be executed every 100 ms on one of the processors 343, each of the threads 610 that are executed on the same processor may be configured to yield the processor every 20 ms, so as to ensure that the execution period of the poller would not be overrun by more than 20 ms As can be readily appreciated, this arrangement may ensure prompt execution of the poller 620 and prevent any of the threads 610 from monopolizing the processor on which the poller 620 is executed.

Figure 7:
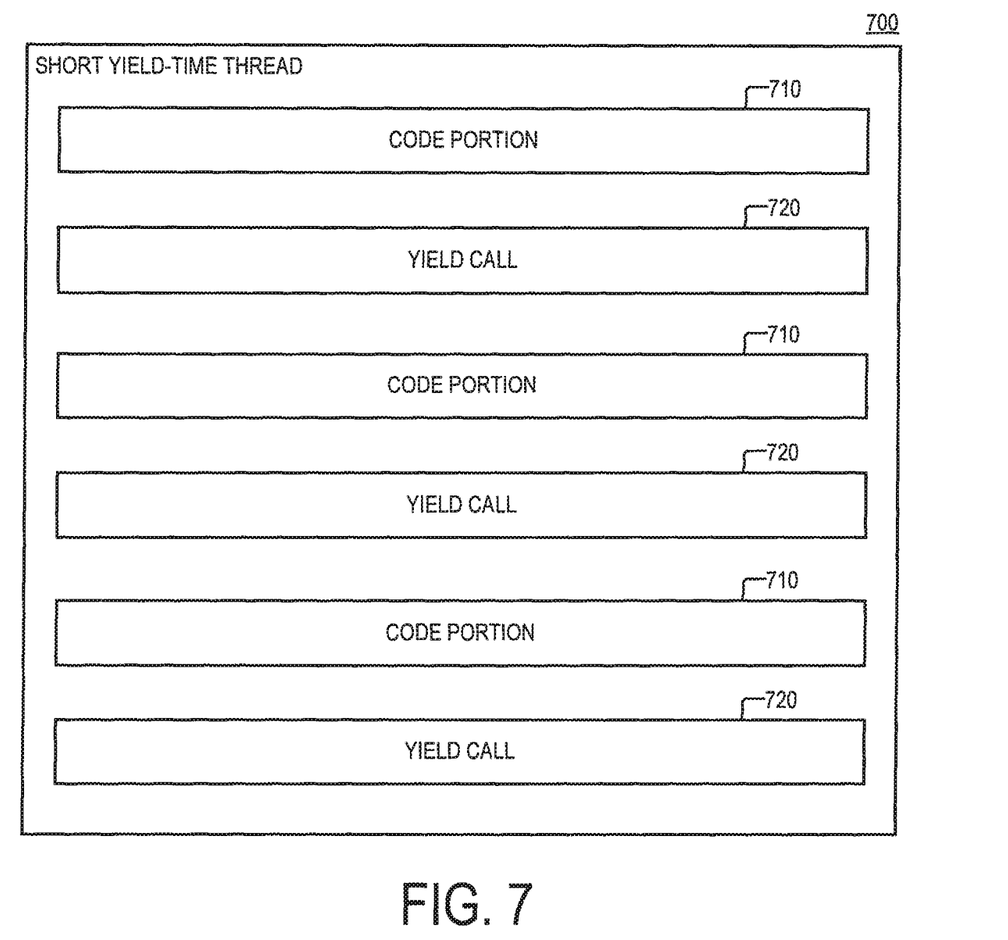
FIG. 7 is a diagram of an example of a thread, according to aspects of the disclosure.

FIG. 7 shows an example of a short-yield thread 700, according to aspects of the disclosure. The short-yield thread 700 may be the same or similar to any of the threads 610. As illustrated, the thread 700 may include a plurality of code portions 710 that are separated by yield calls 720. Each of the code portions 710 may include a plurality of processor-executable instructions that have roughly the same execution time. Each of the yield calls 720 may include a system call function, which, when invoked, causes the thread 700 to relinquish the processor on which it is being executed. In some implementations, the breakdown of the thread 700 into code portions may be determined by inserting debug traces in the code of the thread, using the traces to identify parts of the code that take longer than a predetermined yield period, and inserting a yield call in the identified parts to ensure that the desired yield period would be complied with.

Returning to FIG. 6, each of the pollers 620 may be configured to execute on a different one of the processors 343. For example, poller 620a may be executed on processor 343a, poller 620b may be executed on processor 343b, poller 620c may be executed on processor 343c, and poller 620d may be executed on processor 343d. In some implementations, each of the pollers 620 may be configured to perform the process 500, which is discussed above with respect to FIG. 5.

Unlike the pollers 410, each of the pollers 620 may be configured to identify storage device operations that are requested by threads 420 that are executed on any one of the processors 343. For example, poller 410a may identify completed storage device operations that have been requested by threads 420 that are executed on any of processors 343a-d; poller 410b may identify completed device operations that have bee requested by threads 420 that are executed on any of processors 343a-d; poller 410c may identify completed device operations that have been requested by threads 420 that are executed on any of processors 343a-d; and poller 410d may identify completed device operations that have been requested by threads 420 that are executed on any of processors 343*a-d*.

Additionally or alternatively, unlike the pollers 410, each of the 620 may be configured to wake up threads 420 that are executed on any one of the processors 343*a-d*. For example, poller 620*a* may wake up threads that are executed on any of processors 343*a-d*; poller 620*b* may wake up threads 420 that are executed on any of processors 343*a-d*; poller 410*c* may wake up threads 420 that are executed on any of processors 343*a-d*; and poller 410*d* may be configured to wake up threads 420 that are executed on any of processors 343*a-d*.

The execution of the pollers 620 may be synchronized, such that only one of the pollers 620 is executed by the storage node 220 (i.e., by any of the processors 343) at any given time. The synchronization may be accomplished by a using synchronization object 630. The synchronization object 630 may include a spinlock and/or any other suitable type of synchronization object. In operation, each of the pollers 620 may be configured to request the synchronization object, execute the process 500 after it has been granted possession of the synchronization object, and relinquish possession of the synchronization object after the execution of the process 500 is completed. As noted above, in some implementations, possession of the synchronization object may be granted to only one poller 620 at a time.

According to aspects of the disclosure, the synchronization of the pollers 620 may help to avoid the unnecessary use of computing resources that might occur if multiple pollers 620 are (redundantly) accessing the completion queue 414 at the same time. More particularly, in some implementations, the synchronization object may be implemented as an atomic boolean variable, which is set to TRUE if any of the pollers 620 is currently executing, and which is set to FALSE if none of the pollers 620 is currently being executed. In such implementations, each of the pollers 620, at the beginning of its execution, may check the value of the variable and terminate (without proceeding any further), if the variable is set to TRUE.

In some respects, arranging the pollers 620 to operate on threads that are executed on any of the processors 343 may increase the effective rate at which the completion of storage device operations is detected by a factor that is equal to the total count of pollers 620. For instance, consider a scenario in which each of the pollers 410/620 is executed at 100 ms. In the example of FIG. 4, the completion of storage device operations requested by threads executed on the processor 343*a* will be detected only when poller 410*a* is executed (e.g., every 100 ms). By contrast, in the example of FIG. 6, the completion of storage device operations requested by threads executed on the processor 343*a* would be requested every 25 ms because each of the pollers 620 is capable of detecting the completion of storage device operation is requested by threads executed on the processor 343*a*.

FIGS. 1-7 are provided as an example only. Although in the example of FIGS. 1-7 each of the storage nodes 220 is a separate computing device, alternative implementations are possible in which two or more of the nodes are virtual storage nodes. In such implementations, multiple virtual storage nodes may be executed on the same computing device. Although in the example of FIG. 5, the pollers 410/620 are used to poll a storage device driver, alternative implementations are possible in which any other suitable type of device driver is polled instead. According to the present object, the term "device driver" may include one or more objects that are instantiated in an operating system and used to interact with a hardware device.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage node, the method comprising:
   instantiating a first poller for detecting whether pending storage device operations have been completed;
   executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, the first function being executed in a user space of the storage node, (b) terminating the execution of the first poller when the completion queue is empty, and (c) executing a system call function to the storage device driver only when the completion queue is not empty, wherein the system call function is executed in a kernel space of the storage node, and the system call function is configured to identify one or more operations that are listed in the completion queue;
   identifying a first thread that is waiting for the first storage device operation to be completed; and
   transitioning the first thread from a waiting state to a ready state.

2. The method of claim 1, wherein the first thread is arranged to execute a processor yield operation at intervals that are less than or equal to a scheduling interval of the first poller.

3. The method of claim 1, further comprising:
   instantiating a second poller for detecting whether pending storage device operations have been completed;
   executing the second poller to identify a second storage device operation that has been completed, wherein executing the second poller includes: (a) executing the first function to detect whether the completion queue is empty, (b) terminating the execution of the second poller when the completion queue is empty, and (c) executing the system call function to the storage device driver when the completion queue is not empty;
   identifying a second thread that is waiting for the second storage device operations to be completed; and
   transitioning the second thread from a waiting state to a ready state,
   wherein the first poller is executed by a first processor of the storage node and the second poller is executed by a second processor of the storage node.

4. The method of claim 3, wherein the first poller and the second poller are executed concurrently, the first thread is executed on the first processor, and the second thread is executed on the second processor.

5. The method of claim 3, further comprising instantiating a poller synchronization object, wherein the first poller and the second poller are executed at least in part sequentially based on the poller synchronization object, the first thread is executed on either one of the first processor and the second processor, and the second thread is executed on either one of the first processor and the second processor.

6. An apparatus, comprising:
   a memory; and
   a processing circuitry operatively coupled to the memory, the processing circuitry being configured to perform the operations of:
   instantiating a first poller for detecting whether pending storage device operations have been completed;
   executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, the first function being executed in a user space of the storage node, (b) terminating the execution of the first poller when the completion queue is empty, and (c) executing a system call function to the storage device driver only when the completion queue is not empty, wherein the system call function is executed in a kernel space of the storage node, and the system call function is configured to identify one or more operations that are listed in the completion queue;
   identifying a first thread that is waiting for the first storage device operation to be completed; and transitioning the first thread from a waiting state to a ready state.

7. The apparatus of claim 6, wherein the first thread is arranged to execute a processor yield operation at intervals that are less than or equal to a scheduling interval of the first poller.

8. The apparatus of claim 6, wherein the processing circuitry is further configured to perform the operations of:
instantiating a second poller for detecting whether pending storage device operations have been completed;
executing the second poller to identify a second storage device operation that has been completed, wherein executing the second poller includes: (a) executing the first function to detect whether the completion queue is empty, (b) terminating the execution of the second poller when the completion queue is empty, and (c) executing the system call function to the storage device driver when the completion queue is not empty;
identifying a second thread that is waiting for the second storage device operation to be completed; and
transitioning the second thread from a waiting state to a ready state,
wherein the processing circuitry includes a first processor and a second processor, and
wherein the first poller is executed by the first processor and the second poller is executed by the second processor.

9. The apparatus of claim 8, wherein the first poller and the second poller are executed concurrently, the first threads is executed on the first processor, and the second thread is executed on the second processor.

10. The apparatus of claim 8, further comprising instantiating a poller synchronization object, wherein the first poller and the second poller are executed at least in part sequentially based on the poller synchronization object, the first thread is executed on either one of the first processor and the second processor, and the second thread is executed on either one of the first processor and the second processor.

11. A non-transitory computer-readable medium storing one or more processor-executable instructions, which when executed by a processing circuitry of a storage node cause the processing circuitry to perform the operations of:
instantiating a first poller for detecting whether pending storage device operations have been completed;
executing the first poller to identify a first storage device operation that has been completed, wherein executing the first poller includes: (a) executing a first function to detect whether a completion queue corresponding to a storage device driver is empty, the first function being arranged to read a content of a memory location that is associated with the completion queue, the first function being executed in a user space of the storage node, (b) terminating the execution of the first poller when the completion queue is empty, and (c) executing a system call function to the storage device driver when the completion queue is not empty, wherein the first poller is configured to execute the system call function only when the completion queue is not empty, the system call function is executed in a kernel space of the storage node, and the system call function is configured to identify one or more operations that are listed in the completion queue;
identifying a first thread that is waiting for the first storage device operation to be completed; and
transitioning the first thread from a waiting state to a ready state.

12. The non-transitory computer-readable of claim 11, wherein the first thread is arranged to execute a processor yield operation at intervals that are less than or equal to a scheduling interval of the first poller.

13. The non-transitory computer-readable of claim 11, further comprising:
instantiating a second poller for detecting whether pending storage device operations have been completed;
executing the second poller to identify one or more second storage device operations that have been completed, wherein executing the second poller includes: (a) executing the first function to detect whether the completion queue is empty, (b) terminating the execution of the second poller when the completion queue is empty, and (c) executing the system call function to the storage device driver when the completion queue is not empty;
identifying a second thread that is waiting for the second storage device operation to be completed; and
transitioning the second thread from a waiting state to a ready state,
wherein the processing circuitry includes a first processor and a second processor, and
wherein the first poller is executed by the first processor and the second poller is executed by the second processor.

14. The non-transitory computer-readable of claim 13, wherein the first poller and the second poller are executed concurrently, the first thread is executed on the first processor, and the second thread is executed on the second processor.

15. The non-transitory computer-readable of claim 13, further comprising instantiating a poller synchronization object, wherein the first poller and the second poller are executed at least in part sequentially based on the poller synchronization object, the first thread include is executed on either one of the first processor and the second processor, and the second thread is executed on either one of the first processor and the second processor.

* * * * *